(12) United States Patent
Tseng

(10) Patent No.: US 9,858,493 B2
(45) Date of Patent: Jan. 2, 2018

(54) METHOD AND APPARATUS FOR PERFORMING REGISTRATION PLATE DETECTION WITH AID OF EDGE-BASED SLIDING CONCENTRIC WINDOWS

(71) Applicant: Faraday Technology Corp., Hsin-Chu (TW)

(72) Inventor: Chien-Chung Tseng, Hsin-Chu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 15/183,817

(22) Filed: Jun. 16, 2016

(65) Prior Publication Data
US 2017/0286793 A1 Oct. 5, 2017

(30) Foreign Application Priority Data

Mar. 30, 2016 (TW) .............................. 105109985 A

(51) Int. Cl.
*G06K 9/00* (2006.01)
*G06K 9/32* (2006.01)
*G06K 9/46* (2006.01)
*G06K 9/48* (2006.01)
(Continued)

(52) U.S. Cl.
CPC ............... *G06K 9/325* (2013.01); *G06K 9/38* (2013.01); *G06K 9/40* (2013.01); *G06K 9/4661* (2013.01); *G06K 9/48* (2013.01); *G06K 2009/485* (2013.01); *G06K 2209/15* (2013.01)

(58) Field of Classification Search
None
See application file for complete search history.

(56) References Cited

U.S. PATENT DOCUMENTS

| 7,805,003 B1* | 9/2010 | Cohen | G06K 9/00463 382/103 |
| 2011/0135156 A1* | 6/2011 | Chen | G06K 9/325 382/105 |

FOREIGN PATENT DOCUMENTS

| TW | 584811 | 4/2004 |
| TW | 201514943 A | 4/2015 |

OTHER PUBLICATIONS

Kang-Hyun Jo ("Vehicle License Plate Detection Method Based on Sliding Concentric Windows and Histogram.", Journal of Computers, vol. 4, No. 8, Aug. 2009, pp. 771-777).*

* cited by examiner

*Primary Examiner* — Weiwen Yang
(74) *Attorney, Agent, or Firm* — Winston Hsu

(57) ABSTRACT

A method for performing registration plate detection includes: performing image processing on image data of a predetermined region in an image to generate an edge image; and performing registration plate detection according to the edge image and the image data of the predetermined region to determine a location of a registration plate image within the predetermined region, for performing a post-processing corresponding to the registration plate image. The step of performing the image processing includes: performing gradient calculations on image data of the predetermined region to generate a gradient image, where the gradient image includes gradient data of the predetermined region; performing edge threshold estimation on the gradient data of the predetermined region, to update an edge threshold through a set of iterative calculations; and generating the edge image according to the edge threshold and according to selective gradient data of the predetermined region.

19 Claims, 8 Drawing Sheets

(51) Int. Cl.
*G06K 9/38* (2006.01)
*G06K 9/40* (2006.01)

| -1 | 0 | 1 |
|----|---|---|
| -2 | 0 | 2 |
| -1 | 0 | 1 |

METHOD AND APPARATUS FOR PERFORMING REGISTRATION PLATE DETECTION WITH AID OF EDGE-BASED SLIDING CONCENTRIC WINDOWS

BACKGROUND OF THE INVENTION

1. Field of the Invention

The present invention relates to image identification, and more particularly, to a method and an apparatus for registration plate detection.

2. Description of the Prior Art

A vehicle registration plate is a plate having a numeric and/or alphanumeric identifier which can be affixed to a vehicle for official identification. Examples of the vehicle may include, but are not limited to, a car, a scooter, and a boat, and examples of the vehicle registration plate may include, but are not limited to, a license plate, and a number plate. Some conventional registration plate detection methods detect the location of the registration plate in an image. This registration plate detecting mechanism can be utilized as the unit that operates first in a registration plate identifying process; therefore, whether the subsequent operations can effectively identify (or recognize) the registration plate is based on the quality of the registration plate detecting mechanism. Some problems may occur, however. For example, one conventional registration plate detection method can rapidly perform registration plate detection, but the registration plate detection result thereof is typically affected by variation in ambient light and may easily be incorrect. Therefore, this method is not suitable for practical applications such as parking lot management. In another conventional registration plate detection method, complicated calculations are required, resulting in the overall speed of registration plate identification to be extremely slow. Thus, conventional registration plate detection methods cannot guarantee both high accuracy and high speed.

Therefore, a novel method and a corresponding architecture are required to perform registration plate detection without any side effects.

SUMMARY OF THE INVENTION

One of the objectives of the present invention is to provide a method and an apparatus for registration plate detection to solve the abovementioned problems.

A method and an apparatus for registration plate detection are provided to effectively identify a registration plate without any side effects.

The method and apparatus for registration plate detection which can quickly and accurately detect registration plates for advance applications including (but not limited to) registration plate identification and distance measurement can be applied in scenarios like parking lot management, surveillance system management, self-driving and collision avoidance systems.

According to an embodiment of the present invention, a method for registration plate detection is disclosed, wherein the method comprises: performing an image process on an image data of a predetermined region of an input image to generate an edge image; and performing a registration plate detection according to the edge image and an image data of the predetermined region to determine a location of a registration plate image in the predetermined region for a post-process regarding the registration plate detection. The step of performing the image process further comprises: performing a gradient calculation on the image data of the predetermined region to generate a gradient image, wherein the gradient image comprises a gradient data of the predetermined region; performing an edge threshold estimation upon the gradient data of the predetermined region to update an edge threshold via an iterative calculation; and generating the edge image according to the edge threshold and according to the selective gradient data of the predetermined region. The step of performing image process comprises: processing the image data of the predetermined region according to the edge threshold and according to a selective filter to generate the edge image, wherein the selective filter is arranged to perform a selective filtering upon the image data of the predetermined region to generate a selective filter gradient image, where the selective filter gradient image comprises the selective gradient data of the predetermined region.

The present invention also discloses an apparatus for registration plate detection according to the abovementioned method, wherein the apparatus for registration plate detection comprises at least a portion of an electronic device (e.g. a portion or all of it).

According to an embodiment of the present invention, an apparatus for registration plate detection is disclosed, wherein the apparatus comprises at least a portion of an electronic device (e.g. a portion or all of it). The apparatus comprises a processing circuit for controlling the operation of the apparatus, wherein the processing circuit comprises an image processing module and a registration plate detecting module, and the image processing module comprises a gradient image creation unit and an edge threshold estimation unit. The image processing module is arranged to process image data of a predetermined region of an input image to generate an edge image. The gradient image creation unit is for performing a gradient calculation upon the image data of the predetermined region to generate an edge image, wherein the gradient image comprises a gradient data of the predetermined region; and the edge threshold estimation unit is for performing edge threshold estimation on the gradient data of the predetermined region to update an edge threshold via an iterative calculation, wherein the image processing module is arranged to generate the edge according to the edge threshold and according to the selective gradient data of the predetermined region. The image processing module is for processing the image data of the predetermined region according to the edge threshold and according to a selective filter to generate the edge image, wherein the selective filter is for performing the selective filtering upon the image data of the predetermined region to generate a selective filter gradient image, where the selective filter gradient image comprises a selective gradient data of the predetermined region. The registration plate detecting module is for detecting a registration plate according to the edge image and the image data to determine a location of a registration plate image in the predetermined region for post-process regarding the registration plate image.

One of the advantages of the present invention is the disclosed method and apparatus can improve the performance of registration plate detection. Compared to the prior art, the disclosed method and apparatus can improve the effectiveness of the electronic device with few, or no, side effects. More particularly, the electronic device implemented by the disclosed method and apparatus does not have an over-size issue, the architecture is not too complex, and the waiting time is not too long.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
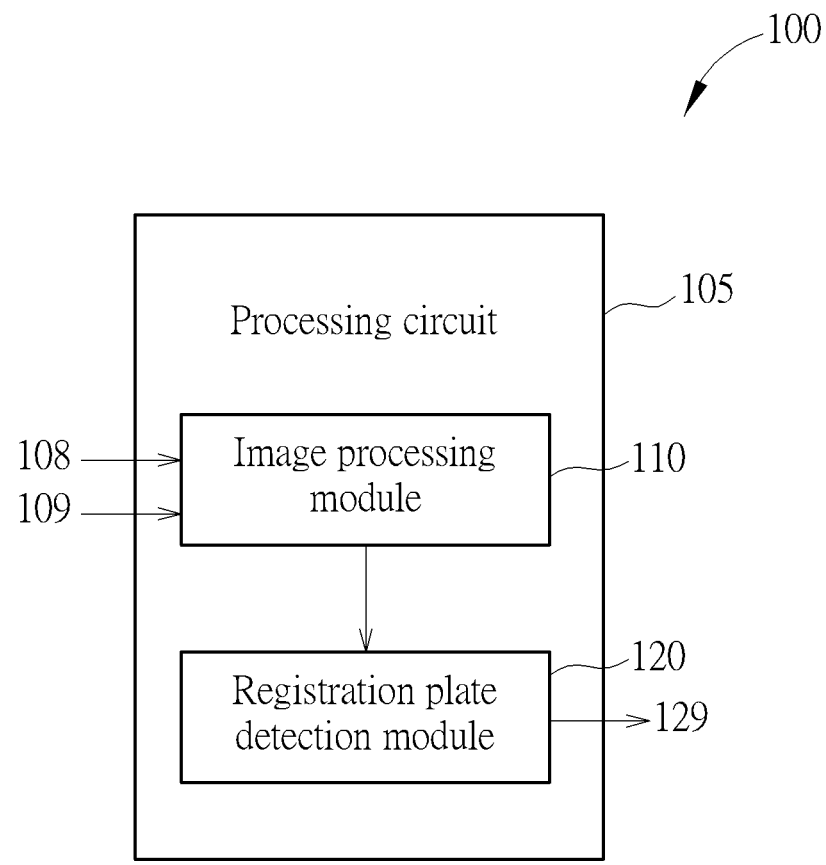
FIG. 1 is a diagram illustrating an apparatus for registration plate detection according to an embodiment of the present invention.

FIG. 1 is a diagram illustrating an apparatus 100 for registration plate detection according to an embodiment of the present invention. The apparatus 100 may comprise a portion of the electronic device (e.g. a portion or all of it). The apparatus 100 comprises a control circuit of the electronic device implemented by an integrated circuit. In a modification, the apparatus 100 may comprise the electronic device. In yet another example, the apparatus 100 may be a system comprising the electronic device such as a computer system. The electronic device can be (but is not limited to) a personal computer, a host device applied in a parking lot management system, a host device applied in a self-driving system and a host device applied in a collision avoidance system.

As shown in FIG. 1, the apparatus 100 for registration plate detection comprises a processing circuit arranged to control the operation of the apparatus 100, wherein the processing circuit 105 comprises an image processing module 110 and a registration plate detecting module 120. According to this embodiment, the processing circuit 105 may comprise at least a processor (e.g. one or more processors) and a peripheral circuit of the processor, wherein the processor executes at least one program module, e.g. a plurality of program modules. The plurality of program modules may comprise an image processing module 110 and a registration plate detecting module 120, but this is only for illustrative purpose, and not a limitation of the present invention. According to some embodiments, the processing circuit 105 can be implemented as a customized circuit such as an Application-Specific Integrated Circuit (ASIC), and the image processing module 110 and the registration plate detecting module 120 can be the sub-circuits of the customized circuit.

The image processing module 110 can process image data of a predetermined region in an input image 108 to generate an edge image EI, wherein a parameter 109 of the predetermined region is arranged to point out a location of the predetermined region in the input image 108. The input image 108 may comprise an image data saved temporarily in a digital image buffer, e.g. a gray-level image data. The predetermined region may be a Region of Interest (ROI) indicated by a user or may be a region of a whole image dynamically or directly determined by other algorithms according to the input image 108. The registration plate detecting module 120 performs the registration plate detection according to the edge image EI and the image data of the predetermined region to determine a location of a registration plate image in the predetermined region for performing a post-process regarding the registration plate image, wherein a location parameter 129 of the registration plate image indicates a relative location of the registration plate image in the predetermined region. The location parameter 120 of the registration plate image can be outputted to a post-processing circuit for the post-process. According to some embodiments, the post-processing circuit can be implemented in the processing circuit 105. For example, the post-processing circuit can be implemented by a post-processing module of the plurality of program module, wherein the post-processing module can be executed by the processor. In another example, the post-processing circuit can be implemented as a sub-circuit of the customized circuit.

Figure 2:
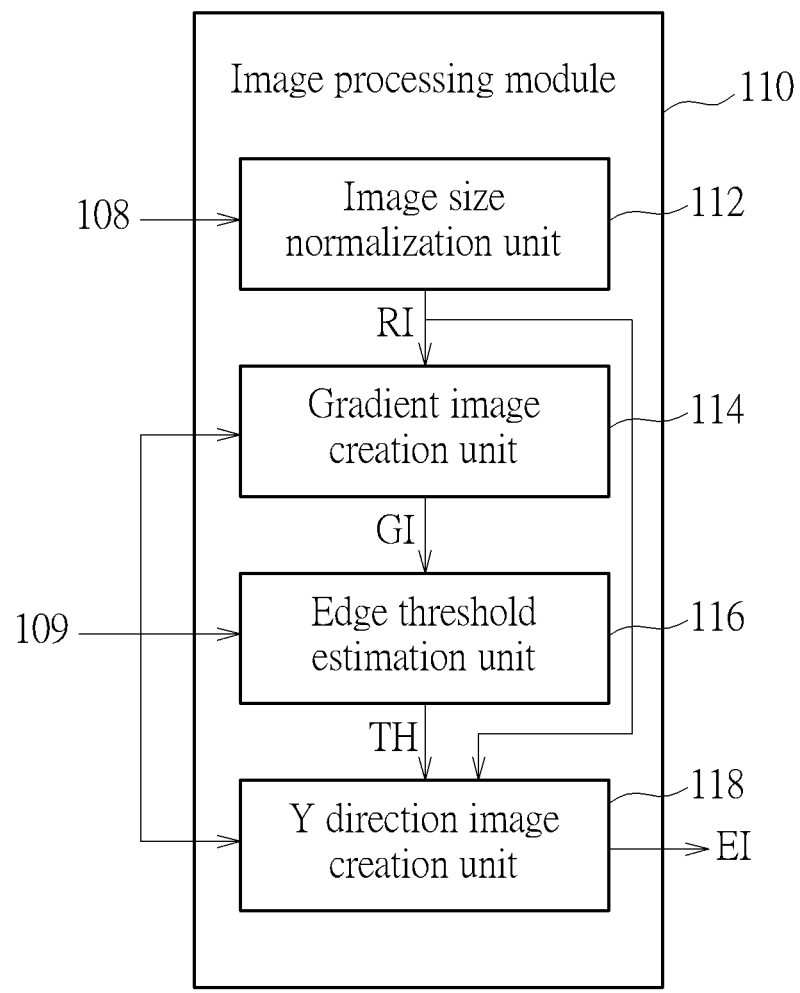
FIG. 2 is a diagram illustrating implementation details of the image processing module shown in FIG. 1 according to an embodiment.

FIG. 2 is a diagram illustrating implementation details of the image processing module 110 shown in FIG. 1 according to an embodiment, wherein the image processing module 110 may comprise a image size normalization unit 112, a gradient image creation unit 114, an edge threshold estimation unit 116 and a specific-direction-edge image creation unit such as a Y-direction edge image creation unit 118. In a situation where the image processing module 110 is a program module of the plurality of program modules, the units 112, 114, 116 and 118 shown in FIG. 2 can be sub-modules of the program module. In another example, in a situation where the image processing module 110 is a sub-circuit of the customized circuit, the units 112, 114, 116 and 118 shown in FIG. 2 can be internal circuits of the sub-circuit.

Figure 3:
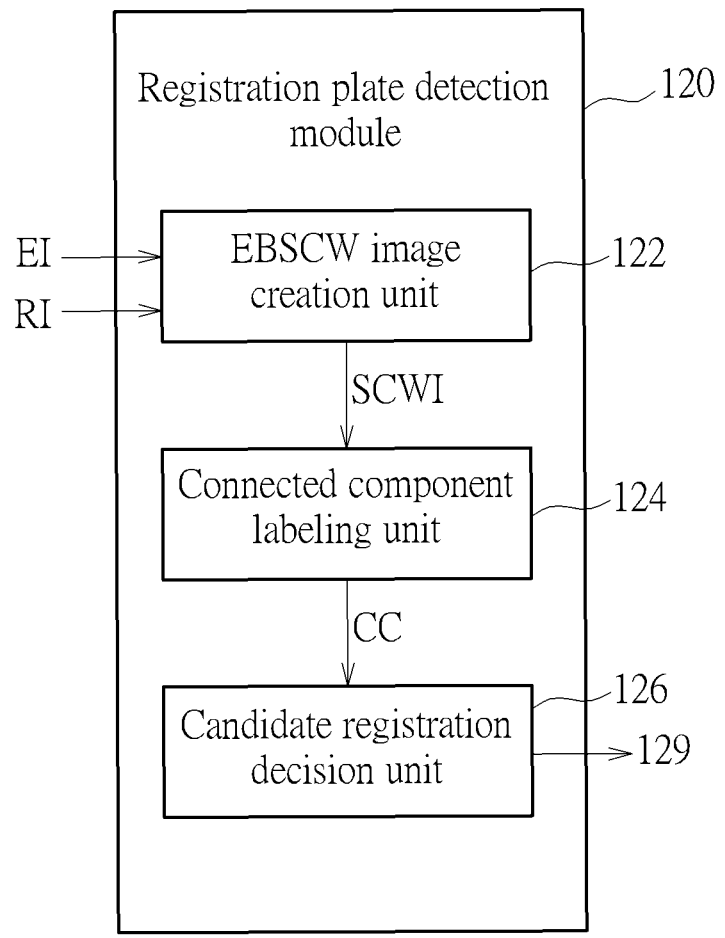
FIG. 3 is a diagram illustrating implementation details of the registration plate detecting module shown in FIG. 1 according to an embodiment.

FIG. 3 is a diagram illustrating implementation details of the registration plate detecting module 120 shown in FIG. 1 according to an embodiment. The registration plate detecting 120 may comprise a sliding concentric window (SCW) image creation unit such as an edge-based sliding concentric window (EBSCW) image creation unit 122, a connected component labeling unit 124 and a candidate registration plate decision unit 126. For example, in a situation where the registration plate detecting module 120 is a program module of the plurality of program modules, the units 122, 124 and 126 shown in FIG. 3 can be sub-modules of the program module. In another example, in a situation where the registration plate module 120 is a sub-circuit of the customized circuit, the units 122, 124 and 126 shown in FIG. 3 can be internal circuits of the sub-circuit.

Figure 4:
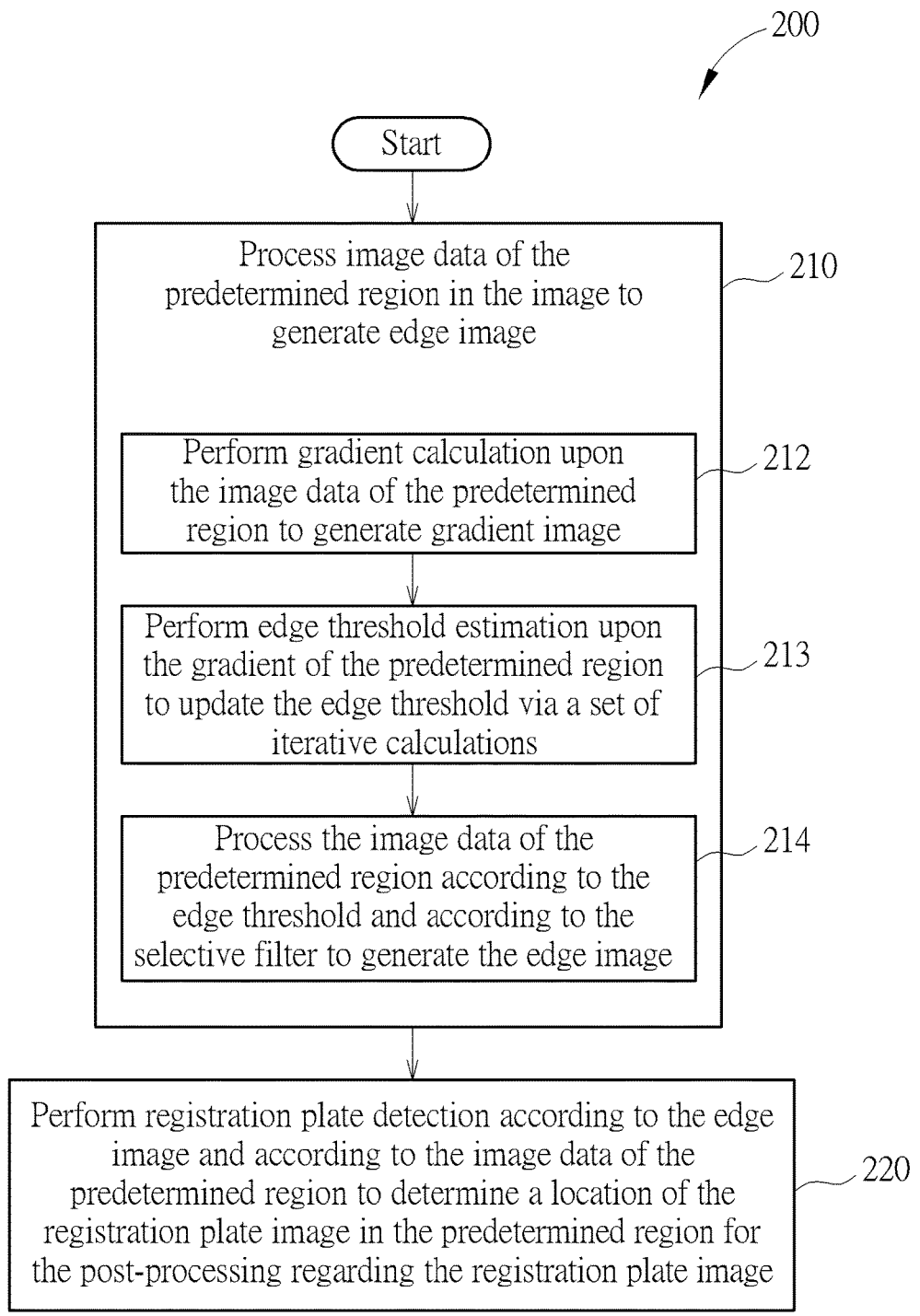
FIG. 4 is a flowchart illustrating a method for registration plate detection according to an embodiment of the present invention.

FIG. 4 is a flowchart illustrating a method 200 for registration plate detection according to an embodiment of the present invention, wherein the method 200 can be applied in the apparatus 100 shown in FIG. 1, and can also be applied in the processing circuit 105 shown in FIG. 1. The method can be summarized as follows.

In step 210, the image processing module 100 performs the image process upon the image data of the predetermined region in the input image 108 (e.g. a gray-level image) to generate the edge image EI. The image size normalization unit 112 can obtain the image data of the predetermined region in the input image 108 from the input image 108 for the gradient image creation unit 114, the Y-direction edge image creation unit 118 or the registration plate detecting module 120, wherein the predetermined region in the input image 108 represents a resized image RI, and the image data of the predetermined region can be a pixel value of the resized image RI.

It should be noted that the resized image RI can be derived from the predetermined region in the input image 108, and can comprise at least a portion (e.g. a portion or all) of the input image 108. Typically, the predetermined region can be a part of the input image 108, i.e. the resized image RI can be a part of the input image 108. The resized image RI and the input image 108 have the same Dot Per Inch (DPI), and the resized input RI can be a part of the input image 108. Therefore, the resized image RI can be smaller than the input image 108. According to some embodiments, the predetermined region can be defined the whole input image 108, i.e. the resized image RI is the input image 108. In this situation, the resized image RI and the input image 108 can have the same size.

In step 212, the gradient image creation unit 114 performs a gradient calculation upon the image data of the predetermined region to generate a gradient image GI, wherein the gradient image GI comprises the gradient data of the predetermined region which is the calculation result of the gradient calculation. The gradient image GI may comprise a plurality of pixels corresponding to the predetermined region, and the gradient data of the predetermined region can be used as the gray level of the plurality of pixels of the gradient image GI to present the gradient variation of the image data (i.e. the resized image RI) of the predetermined region.

In step 213, the edge threshold estimation unit 116 performs an edge threshold estimation upon the gradient data of the predetermined region to calculate an edge threshold TH via a set of iterative calculations. By using the set of iterative calculations to calculate the updated edge threshold TH, the image processing module 110 can adaptively generate an adapted edge image EI, especially the edge image EI adapted for the related operation of the EBSCW image creation unit 122 of the registration plate detecting module 120. Therefore, the apparatus 100 can obtain high correctness and high speed of registration plate detection.

In step 214, the specific-direction edge image generating unit such as the Y-direction edge image generating unit 118 can process the image data (i.e. the resized image RI) of the predetermined region according to the edge threshold TH (updated by the edge threshold estimation unit 116) and a selective filter to generate the edge image EI. The specific-direction edge image generating unit such as the Y-direction edge image generating unit 118 may use the selective filter to filter the resized image RI to generate a selective filter gradient image, wherein the selective filter gradient image comprises the selective gradient data of the predetermined region such as the Y-direction gradient data of the resized image RI.

In step 220, the registration plate detecting module 120 performs the registration detection according to the edge image EI and the image data (i.e. the resized image RI) of the predetermined region to locate the registration plate image in the predetermined region to perform the post-process regarding the registration plate. For example, during the process of registration plate detection, the registration plate detecting module 120 uses the EBSCW image creation unit 122 to find a stronger edge to locate the high contrast spot among the stronger edges. Accordingly, the adapted data can be found so the component labeling unit 124 can perform component labeling, wherein the candidate registration plate decision unit 126 locates the registration plate according to the component labeling result. The advanced implemented detail of the registration plate detection will be discussed in the following embodiments.

Examples of the post-process may comprise (but are not limited to): a stop-and-go process of a stop-and-go function within a plurality of functions of an Advanced Driver Assistance Systems (ADAS), a Forward Collision Warning (FCW) process of an FCW function within the plurality of functions of the ADAS, a character segmentation (CS) process and an optical character recognition (OCR) process. The stop-and-go process implemented by the method 200 can detect vehicles which have not started or moved forward after traffic lights turn green, and therefore reminds drivers to continue to drive. Regarding the FCW function, when two vehicles are getting too close, traditional methods cannot detect the distance between this car and the front car. The FCW process implemented by the method 200 can estimate the distance based on the size of the detected registration plate to solve the abovementioned problem. In yet another example, the character segmentation process and the optical character recognition process implemented by the method 200 can perform registration plate identification for the surveillance system on registration plates of vehicles coming in and out over a whole day.

Figures 5, 6:
FIG. 5 is a diagram illustrating a gradient image of the method shown in FIG. 4 according to an embodiment.
FIG. 6 is a diagram illustrating a selective filter of the method shown in FIG. 4 according to an embodiment.

FIG. 5 is a diagram illustrating a gradient image of the method 200 shown in FIG. 4 according to an embodiment, wherein the gradient image shown in FIG. 5 can be an example of the gradient image GI. In a situation where the electronic device is a host device of the parking lot managing system, the input image 108 can be an image of a transportation such as a motorcycle, especially a gray image taken from the rear of the motorcycle parked in front of an entrance gate of a parking lot, where the apparatus 100 allows the user to set up a set of normalization parameters for predefining the region around the entrance gate of the parking lot as the predetermined region and excluding the background part which should not be considered in this operation. In another example, in a situation where the electronic device is a host device of a self-driving system, the input image 108 can be an image of a transportation such as a motorcycle, especially a gray image taken from the rear of a motorcycle which is moving in front of a vehicle being driven by the user, where the apparatus 100 allows the user to set up a normalization parameter to predefine a distance ahead of the vehicle being driven by the user as the predetermined region and exclude the part of the background which should not be considered in this operation. For the abovementioned examples, although the object locked on by the camera changes dynamically, the size of the object (e.g. the motorcycle) in the resized image RI derived by the image size normalization unit 112 stays the same. According to some embodiments, the normalization performed by the image size normalization unit 112 based on the set of normalization parameters can be applied in different cameras with different resolutions. In some embodiments, the transportation is not limited to be a motorcycle. It can be a motorcycle, a car, a boat, etc. or any kind of transportation.

According to this embodiment, the gradient image creation unit 114 can calculate an X-direction gradient Δx and a Y-direction gradient Δy of the resized image RI, and calculates the gradient magnitude of every pixel of the resized image RI according to the following equation:

$$G=\sqrt{\Delta x^2 + \Delta y^2};$$

wherein the symbol G is the gradient magnitude of every pixel of the resized image RI.

After deriving the gradient magnitude of every pixel of the resized image RI, the gradient image creation unit 114 normalizes the gradient magnitude of these pixels {G} into a range [0, 255] (i.e. normalizes them to be integers within the range [0, 255]) according to a maximum value and a minimum value of the gradient magnitude of these pixels to generate a normalized magnitude of gradient as the pixel value of the plurality of pixels of the gradient image GI. Therefore, the gradient image GI comprises a plurality of gray levels such as the gray level in the range [0, 255].

FIG. 5 illustrates a gradient image from an actual picture as an example. It should be noted that the gradient image shown in FIG. 5 is black and white according to format requirements; however, this is not a limitation of the present invention. In addition, according to some embodiments such as the embodiment of FIG. 5, the gradient image GI and the resized image RI have the same DPI, and may have the same size, wherein the plurality of pixels within the gradient image GI correspond to the corresponding pixels within the resized image RI, and also correspond to the corresponding pixels within the predetermined region of the input image 108.

According to some embodiments, a ratio of extreme pixel means the number of extreme pixels comprising a common extreme gray level of a binarized version of the gradient image GI to the number of pixels included in the binarized version of the gradient image GI. Additionally, in the process of the set of iterative calculations, the ratio of extreme pixel gradually approaches a predetermined ratio, and the edge threshold value TH varies with the variation of the ratio of extreme pixel. For example, the common extreme gray level may be a maximum gray level such as the gray level 255, the set of extreme pixels may be white pixels, and the ratio of extreme pixel may be a ratio of white pixel. In another example, the common extreme gray level may be a minimum gray level such as a gray level 0, the set of extreme pixels may be black pixels, and the ratio of extreme pixel may be a ratio of black pixel.

According to some embodiments, the ratio of extreme pixel can be decided according to the following equation:

$$R=G_{num}/A_{num};$$

wherein the symbol R means the ratio of extreme pixel, the symbol $G_{num}$ means the number of the extreme pixels, and the symbol $A_{num}$ means the number of pixels included in the binarized version of the gradient image GI. Because the binarized version is generated by binarizing the gradient image GI, the number of pixels included in the binarized version equals the number of the plurality of pixels of the gradient image GI.

In particular, the set of iterative calculations can be performed according to the following equation:

$$T_e(K+1)=T_e(k)*(R(k)/R_c)*b;$$

wherein the symbol $T_e$ means a temporary version (or candidate value) of the edge threshold value TH, the symbol k means an iteration index of the set of iterative calculations, the symbol $R_c$ means the predetermined ratio, and the symbol b means a predetermined constant. The set of iterative calculations may comprise a first iterative calculation.

In the process of performing the edge threshold value estimation upon the gradient data of the predetermined region to update the edge threshold value TH via the set of iterative calculations, the edge threshold value estimation unit 116 generates a first estimated edge image EEI(1) according to an initial version $T_e(0)$ (which can be a predetermined constant) of the edge threshold value TH and the gradient data (i.e. the gradient image GI) of the predetermined region, wherein a pixel $EEI(1)_{x,y}$ of the first estimated edge image EEI(1) can be calculated as followed:

if $GI_{x,y}<T_e(0)$, then $EEI(1)_{x,y}=0$;

otherwise, $EEI(1)_{x,y}=255$.

The symbol $GI_{x,y}$ means one of the plurality of pixels of the gradient image GI such as an initial pixel of the gradient image GI corresponding to the pixel $EEI(1)_{x,y}$. In addition, the edge threshold estimation unit 116 performs the first iterative calculation according to the first estimated edge image $EEI(1)_{x,y}$ to generate a first temporary version $T_e(1)$ of the edge threshold value TH, so the edge threshold value TH is updated to be the first temporary version $T_e(1)$, wherein the first estimated edge image EEI(1) can be an example of the binarized version. The first iterative calculation can be performed when k=0 as follows:

$$T_e(1)=T_e(0)*(R(0)/R_c)*b;$$

wherein $R(0)=G_{num}(0)/A_{num}(0)$, and the symbol $G_{num}(0)$ means the number of the extreme pixels of the first estimated edge image EEI(1).

It should be noted that, when at least a predetermined condition corresponding to the set of iterative calculations is fulfilled, the edge threshold value TH is updated as a final version $TH_{FINAL}$ of the edge threshold value TH. Additionally, in step 214, the specific-direction edge image creation unit such as the Y-direction edge image creation unit 118 can process the resized image RI of the predetermined region according to the final version $TH_{FINAL}$ of the edge threshold value, the predetermined region and the selective filter to generate the edge image EI.

After finishing the first iterative calculation, if the predetermined condition corresponding to the set of iterative calculations is fulfilled, the edge threshold value estimation unit 116 outputs the first temporary version $T_e(1)$ (which can be an example of the final version $TH_{FINAL}$) for the specific-direction edge image creation unit such as the Y-direction edge image creation unit 118; otherwise, after finishing the first iterative calculation, at least a following iterative calculation of the first iterative calculation can proceed until the predetermined condition corresponding to the set of iterative calculations is fulfilled. For example, the set of iterative calculations may comprise a second iterative calculation. In the process of performing the edge threshold estimation upon the gradient data of the predetermined region to update the edge threshold TH via the set of iterative calculations, the edge threshold estimation unit 116 generates a second estimation edge image EEI(2) according to the first temporary version $T_e(1)$ of the edge threshold TH and the gradient data (i.e. the gradient image GI) of the predetermined region, wherein a pixel $EEI(2)_{x,y}$ of the second estimation edge image EEI(2) can be calculated as follows:

If $GI_{x,y}<T_e(1)$, $EEI(2)_{x,y}=0$;

Otherwise, $EEI(2)_{x,y}=255$.

wherein the symbol $GI_{x,y}$ means one of the plurality of pixels of the gradient image GI such as an initial pixel corresponding to the pixel $EEI(2)_{x,y}$.

The edge threshold estimation unit 116 performs the second iterative calculation according to the second estimation edge image EEI(2) to generate a second temporary version $T_e(2)$ of the edge threshold TH. Accordingly, the edge threshold TH is updated as the second temporary version $T_e(2)$, wherein the second estimation edge image EEI(2) can be an example of the binarized version. For example, the second iterative calculation is performed in the situation where K=1 as follows:

$$T_e(2)=T_e(1)*(R(1)/R_c)*b;$$

wherein $R(1)=G_{num}(1)/A_{num}$, and the symbol $G_{num}(1)$ means the quantity of the set of extreme pixels of the second estimation edge image EEI(2).

After finishing the second iterative calculation, if the predetermined condition corresponding to the set of iterative calculations is fulfilled, the edge threshold estimation unit 116 outputs the second temporary version $T_e(2)$ (which can also be an example of the final version $TH_{FINAL}$) for the specific direction edge image creation unit such as the Y-direction edge image creation unit 118; otherwise, after finishing the second iterative calculation, at least a following iterative calculation of the second iterative calculation can proceed until the predetermined condition corresponding to the set of iterative calculations is fulfilled, and so on.

According to some embodiments, the predetermined condition can comprise at least one of the following termination criteria:

(a) $ABS(R_c-R(k))<Gamma$; and (b) k is greater or equal to a predetermined maximum; wherein the symbol "ABS( )" means absolute value, and the symbol "Gamma" means a predetermined parameter. When any of the termination criteria is fulfilled, the edge threshold estimation unit 116 outputs the latest temporary version $T_e(k+1)$ (which can also be an example of the final version $TH_{FINAL}$) for the specific direction edge image creation unit such as the Y-direction edge image creation unit 118.

According to some embodiments, in step 214, the specific direction edge image creation unit such as the Y-direction edge image creation unit 118 performs selective filtering upon the image data (i.e. the resized image RI) of the predetermined region to generate the selective filter gradient image, wherein the selective filter gradient image comprises an edge component corresponding to a specific direction, and when generating the selective filter gradient image, the Y-direction edge image creation unit 118 normalizes the gradient magnitude of all pixels to the range [0, 255] (i.e. normalizes to be an integer in the range [0, 255]). In addition, in the step 214, the specific direction edge image creation unit such as the Y-direction edge image creation unit 118 can binarize the selective filter gradient image according to the edge threshold (the final version $TH_{FINAL}$ particularly) to generate the edge image EI. For example, the specific direction can be a vertical direction such as the Y direction instead of a horizontal direction such as the X-direction of the non-input image 108, wherein the selective filter gradient data represents the Y-direction gradient of the image data (i.e. the resized image RI) of the predetermined region. Therefore, an edge direction of each of the plurality of edges of the edge image EI approaches the vertical direction such as the Y-direction instead of the horizontal direction such as the X-direction.

FIG. 6 is a diagram illustrating a selective filter of the method shown in FIG. 4 according to an embodiment, wherein the selective filter is arranged to perform selective filtering. The selective filter can be a sobel vertical filter whose filter parameters are shown in FIG. 6. Edges which are horizontal or almost horizontal do not exist in the edge image EI, and most edges of the edge image EI are vertical or almost vertical. According to some embodiments, the parameters are variable. According to some embodiments, the selective filter is variable.

Figure 7:
FIG. 7 is a diagram illustrating an edge image of the method shown in FIG. 4 according to an embodiment.

FIG. 7 is a diagram illustrating an edge image of the method 200 shown in FIG. 4 according to an embodiment, wherein the edge image shown in FIG. 7, can be an example of the edge image EI. Similar aspects between this embodiment and the aforementioned embodiments/alternative embodiments are omitted here for brevity.

According to some embodiments, the edge image EI comprises the plurality of pixels corresponding to the predetermined region, and the selective gradient data represents the gradient of the specific direction of the image data (i.e. the resized image RI) of the predetermined region, e.g. the gradient of the Y-direction. In the step 220, the EBSCW image creation unit 122 performs a first SCW calculation upon the plurality of pixels of the edge image EI, and performs a second SCW calculation upon a portion of the predetermined region of the input image 108 to generate a SCW image SCW1, wherein according to the result of the first SCW calculation, the portion of the predetermined region of the input image 108 is selected from the predetermined region, and the image data of the SCW image SCW1 corresponds to the result of the second SCW calculation. In addition, connected component labeling (CCL) unit 124 perform a CCL upon the SCW image SCW1 to generate a connected component data CC of a plurality of connected component of the SCW image SCW1, wherein each of the plurality of connected components is generated by a set of pixel labels which are connected to each other. In addition, the connected component data CC also comprises at least a part (e.g. a part or all) of the length, the width or the length-width ratio of each connected component. The connected component data CC can comprise a location, a length, a width, a length-width ratio and a horizontal-scanning peak number of each connected component of the plurality of the connected components, wherein the connected component labeling unit 124 performs at least a horizontal scanning operation upon every connected component to detect the quantity of the peak of pixels of at least a horizontal level as the quantity of the peak of the horizontal scanning. In addition, the candidate registration plate decision unit 126 decides the location of the registration plate in the predetermined region according to the connected component data CC of the plurality of the connected components.

Figure 8:
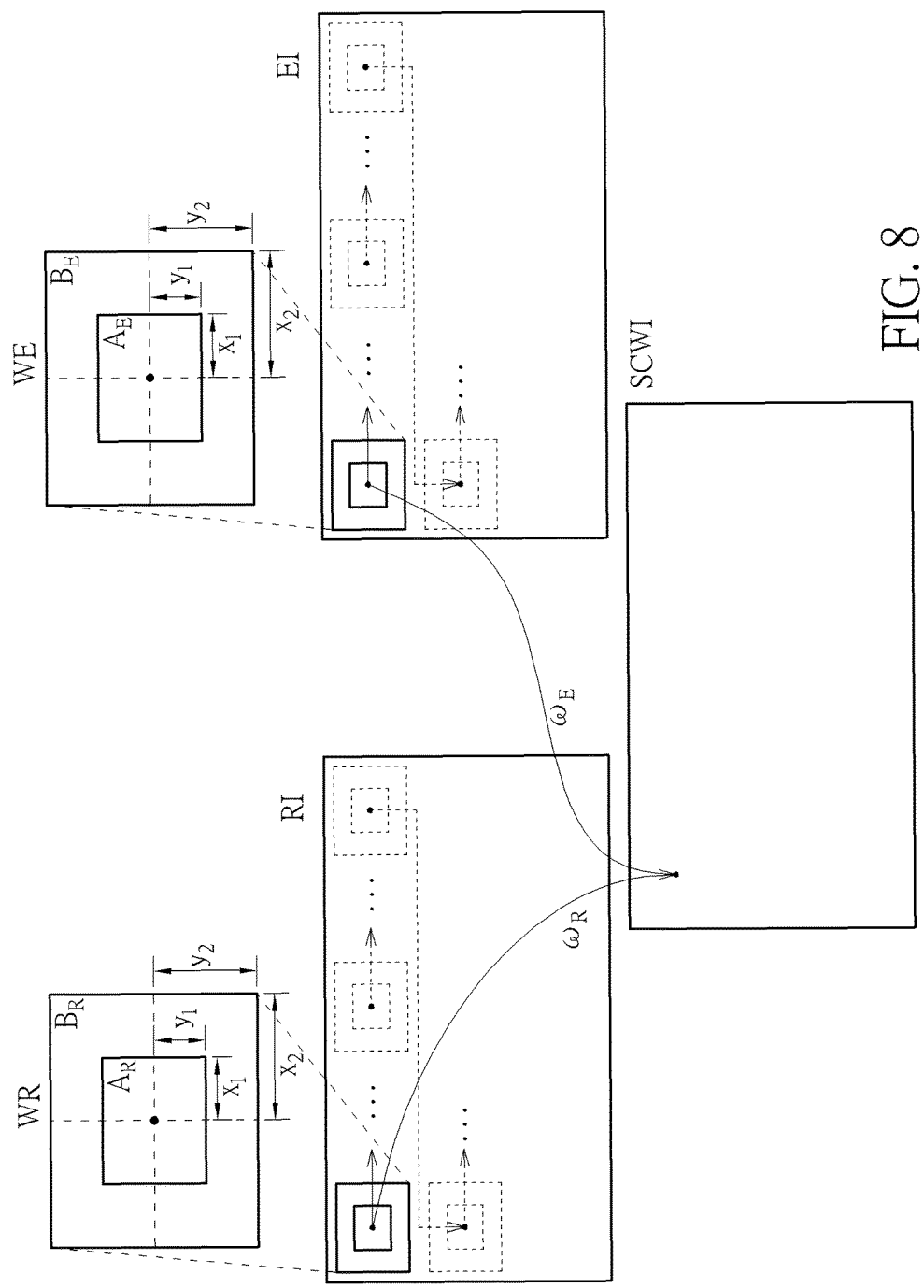
FIG. 8 is a diagram illustrating a strong edge control scheme of the method shown in FIG. 4 according to an embodiment.

FIG. 8 is a diagram illustrating a strong edge control scheme of the method 200 shown in FIG. 4 according to an embodiment, wherein the strong side control scheme is arranged to control the operation of the EBSCW image creation unit 122. The EBSCW image creation unit 122 utilizes a plurality of sets of EBSCW {WE} to calculate the edge degree {we} of the plurality of pixels of the edge image EI respectively, wherein the edge degree $\{\omega_E\}$ represents the edge magnitude of the corresponding pixels in the resized image RI. The EBSCW image creation unit 122 selects a set of stronger-edge pixels among the corresponding pixels in the resized image RI according to the edge degree $\{\omega_E\}$, wherein the edge magnitudes of where the set of stronger-edge pixels locate are greater than the edge magnitudes of where the other pixels of the corresponding pixels in the resized image RI locate. The set of stronger-edge pixels can be an example of the portion of the predetermined region in the abovementioned embodiments. In addition, the EBSCW image creation unit 122 utilizes a plurality of sets of Gray-level-based Sliding Concentric Windows (GBSCWs) {WR} to calculate the contrast degree of the resized image RI {wr} at the location of the set of stronger-edge pixels (i.e. the contrast degree of the location of the set of stronger-edge pixel), wherein the contrast degree $\{\omega_R\}$ corresponds to the contrast magnitude of where the set of stronger-edge pixels locate. It should be noted that, because the set of stronger-edge pixels is selected from the corresponding pixels of the resized image RI, the set of stronger-edge pixels is a subset of the corresponding pixels of the resized image RI, i.e. the set of stronger-edge pixel is pixels of the resized image RI.

As mentioned above, the EBSCW image creation unit 122 has found the set of stronger-edge pixels according to the edge degree $\{\omega_E\}$, i.e. the EBSCW image creation unit 122 has found the location of the strong edges. Next, the EBSCW image creation unit 122 can find the location of the high contrast according to the location of the strong edges. Therefore, the EBSCW image creation unit 122 finds a location comprising the strong edge and the high contrast, and labels the location in the SCW image SCW1. For example, the EBSCW image creation unit 122 determines a set of higher-contrast pixels from the set of stronger-edge pixels, wherein the contrast degrees of where the set of higher-contrast pixels locate are greater than the contrast degrees of where the other pixels in the set of stronger-edge pixels locate. In addition, the EBSCW image creation unit 122 can set each pixel of the set of higher-contrast pixels as a predetermined pixel value to generate the SCW image SCW1, wherein regarding the pixels of the SCW image SCW1, the pixel value of every pixel except for the set of higher-contrast pixels is different from the predetermined pixel value. The EBSCW image creation unit 122 can set each pixel of the set of higher-contrast pixels as a predetermined pixel value such as gray level 255, and can set every pixel of the SCW image SCW1 except for the set of higher-contrast pixels as a predetermined background pixel value such as gray level 0. In another example, the EBSCW image creation unit 122 can set the initial pixel value of each pixel of the SCW image SCW1 as the predetermined background pixel value such as gray level 0 then set each pixel of the set of higher-contrast pixels as a predetermined foreground pixel value such as gray level 255. This is only for illustrative purposes, and not a limitation of the present invention. According to some embodiments, the predetermined pixel value is variable. According to some embodiments, the predetermined foreground and the predetermined background pixel are variable.

As shown at the top right corner of FIG. 8, each set of EBSCW WE of the plurality of sets of EBSCW {WE} can comprise a first inner window $A_E$ and a first outer window $B_E$, wherein the size of the first inner window $A_E$ and the first outer window $B_E$ can be defined by a set of inner window parameters X1 and Y1 and a set of outer window parameter X2 and Y2. In the process of utilizing the plurality of sets of EBSCW {WE} to calculate the edge degree $\{\omega_E\}$ of the plurality of pixels of the edge image EI respectively, the EBSCW image creation unit 122 can calculate a gray level average of the first inner window $A_E$ and a gray level average of the first outer window $B_E$ respectively, and perform a first predetermined linear combination to the gray level averages of the first inner window $A_E$ and the first outer window $B_E$ to generate an edge degree $\omega_E$ of a first pixel of the plurality of pixels of the edge image EI corresponding to the first inner window $A_E$ and the first outer window $B_E$ (more particularly, corresponding to the pixel where the mutual center of the first inner window $A_E$ and the first outer window $B_E$ locates). The first predetermined linear combination can be performed by the following equation:

$$\omega_E = (T_E * E_A) - E_B;$$

wherein the symbol $E_A$ means the gray level average of the first inner window $A_E$, the symbol $E_B$ means the gray level average of the first outer window $B_E$, and the symbol $T_E$ means a predetermined constant.

As shown at the top left corner of FIG. 8, each set of GBSCW WR of the plurality of sets of GBSCW {WR} can comprise a second inner window $A_R$ and a second outer window $B_R$, wherein the size of the second inner window $A_R$ and the second outer window $B_R$ can be defined by the set of inner window parameters X1 and Y1 and the set of outer window parameters X2 and Y2. In the process of utilizing the plurality of sets of GBSCW {WR} to calculate the contrast degree $\{\omega_R\}$ of the set of stronger-edge pixels, the EBSCW image creation unit 122 can calculate a gray level average of the second inner window $A_R$ and a gray level average of the second outer window $B_R$ respectively, and perform a second predetermined linear combination to the gray level averages of the second inner window $A_R$ and the second outer window $B_R$ to generate a contrast degree $\omega_E$ of a second pixel of the set of stronger-edge pixels corresponding to the second inner window $A_R$ and the second outer window $B_R$ (more particularly, corresponding to the pixel where the mutual center of the second inner window $A_R$ and the second outer window $B_R$ locates). The second predetermined linear combination can be performed by the following equation:

$$\omega_R (T_R * R_A) - R_R;$$

wherein the symbol $R_A$ means the gray level average of the second inner window $A_R$, the symbol $R_B$ means the gray level average of the second outer window $B_R$, and the symbol $T_R$ means a predetermined constant.

It should be noted that the sliding path for the edge image EI shown at the top right corner of FIG. 8 can be an example of the sliding path for the plurality of sets of EBSCW {WE}, and the sliding path for the resized image RI shown at the top left corner of FIG. 8 can be an example of the sliding path for the plurality of sets of GBSCW {WR}. According to some embodiments, the sliding path for the plurality of sets of EBSCW {WE} is variable, and the sliding path for the plurality of sets of GBSCW {WR} is variable.

Figure 9:
FIG. 9 is a diagram illustrating a sliding concentric window image of the method shown in FIG. 4 according to an embodiment.

FIG. 9 is a diagram illustrating a sliding concentric window image of the method 200 (the step 200 particularly) shown in FIG. 4 according to an embodiment, wherein the sliding concentric window image shown in FIG. 9 can be an example of the sliding concentric window image SCW1 and can be used for the following connected component labeling unit 124, and the connected component labeling unit 124 is able to find the plurality of connected components of the SCW image SCW1, e.g. the white pixel arrays connected to each other on every edge of the sliding concentric window image shown in FIG. 9. In addition, the connected component labeling unit 124 can output the connected component data CC (e.g. the location, the length, the width, the length-width ratio and the quantity of peak of horizontal scanning) of the plurality of connected components to the candidate registration plate decision unit 126 for determining the location of the registration plate image in the predetermined region. In addition, the candidate registration plate decision unit 126 can exclude the connected component whose connected component data CC does not fit at least a predetermined range (e.g. one or more predetermined ranges) among the plurality of connected components according to the predetermined range. For example, according to a set of predetermined ranges such as a predetermined location range, a predetermined length range, a predetermined width range, a predetermined length-width range and a predetermined quantity of peak range, the candidate registration plate decision unit 126 can exclude the connected component whose connected component data CC does not fit the set of predetermined ranges to select the connected component corresponding to the registration plate image. Therefore, the candidate registration plate decision unit 126 determines the location of the registration plate image according to the location of the connected component. Similar aspects between this embodiment and the aforementioned embodiments/alternative embodiments are omitted here for brevity.

The products implemented by the method 200 and the apparatus 100 of the present invention can automatically adjust the binarized threshold value such as the edge threshold TH for edge detection according to ambient light without being affected by environmental factors. Therefore, users only need to adjust the parameter for the product once in installation. In addition, the method 200 and the apparatus 100 of the present invention only needs to regard the Y-direction gradient, utilize the plurality of sets of EBSCW {WE} to obtain the strong edge region such as the set of stronger-edge pixels, and find the region with high contrast with the plurality of sets of GBSCW {WR} on the strong edge region. In this way, the calculation loading of the products is lower than in conventional architecture. Furthermore, the generated sliding concentric window image can be regarded as the binarized registration plate image for the following registration plate identification. Accordingly, the architecture presented by this invention does not need other local binarization methods, meaning the registration plate detection will not be affected by the vehicle bumper (which is usually rectangular in shape).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing registration plate detection, the method comprising:
   performing image processing upon image data of a predetermined region in an input image to generate an edge image, wherein the step of performing the image processing comprises:
      performing a gradient calculation upon the image data of the predetermined region to generate a gradient image, wherein the gradient image comprises gradient data of the predetermined region;
      performing edge threshold estimation upon the gradient data of the predetermined region to update an edge threshold via a set of iterative calculations; and
      processing the image data of the predetermined region according to the edge threshold and according to a selective filter, to generate the edge image; and
   performing registration plate detection according to the image data of the predetermined region and according to the edge image, to determine a location of a registration plate image in the predetermined region, for performing post-processing corresponding to the registration plate image;
wherein the gradient image comprises a plurality of pixels corresponding to the predetermined region, and the gradient data of the predetermined region are utilized as gray levels of the plurality of pixels of the gradient image; a ratio of extreme pixel represents a ratio of a number of a set of extreme pixels having a common extreme gray level in a binarized version of the gradient image to a total number of pixels in the binarized version; the set of iterative calculations comprises a first iterative calculation and a second iterative calculation following the first iterative calculation; a first candidate value of the edge threshold is obtained by the first iterative calculation, and a second candidate value of the edge threshold is calculated using an equation involving the ratio of extreme pixel and the first candidate value during the second iterative calculation.

2. The method of claim 1, wherein during the set of iterative calculations, the ratio of extreme pixel approaches a predetermined ratio step by step, and the edge threshold varies with respect to the ratio of extreme pixel.

3. The method of claim 2, wherein the ratio of extreme pixel is determined according to the following equation:

$$R=G_{num}/A_{num};$$

where the symbol "R" represents the ratio of extreme pixel, the symbol "$G_{num}$" represents the number of the set of extreme pixels, and the symbol "$A_{num}$" represents the total number of the pixels in the binarized version.

4. The method of claim 3, wherein the set of iterative calculations is performed according to the following equation:

$$T_e(k+1)=T_e(k)*(R(k)/R_C)*b;$$

where the symbol "$T_e$" represents a temporary version of the edge threshold, the symbol "k" represents an iteration index of the set of iterative calculations, the symbol "R" represents the predetermined ratio, and the symbol "b" represents a predetermined constant.

5. The method of claim 2, wherein the common extreme gray level is a maximum gray level, each pixel of the set of extreme pixels is a white pixel, and the ratio of extreme pixel is a ratio of white pixels.

6. The method of claim 1, wherein the step of performing the edge threshold estimation upon the gradient data of the predetermined region to update the edge threshold via the set of iterative calculations further comprises:
   generating a first estimation edge image according to an initial version of the edge threshold and according to the gradient data of the predetermined region; and
   performing the first iterative calculation according to the first estimation edge image to generate a first temporary version of the edge threshold as the first candidate value, so the edge threshold is updated to be the first temporary version;
wherein after the first iterative calculation is finished, at least one subsequent iterative calculation of the first iterative calculation proceeds until at least one predetermined condition corresponding to the set of iterative calculations is satisfied.

7. The method of claim 6, wherein the step of performing the edge threshold estimation upon the gradient data of the predetermined region to update the edge threshold via the set of iterative calculations comprises:
   generating a second estimation edge image according to the first temporary version of the edge threshold and according to the gradient data of the predetermined region; and performing the second iterative calculation according to the second estimation edge image to generate a second temporary version of the edge threshold as the second candidate value, so the edge threshold is updated to be the second temporary version;

wherein after the second iterative calculation is finished, at least one following iterative calculation of the second iterative calculation proceeds until the predetermined condition corresponding to the set of iterative calculations is satisfied.

8. The method of claim 6, wherein when the predetermined condition corresponding to the set of iterative calculations is satisfied, the edge threshold is updated to be a final version of the edge threshold; and the step of generating the edge image comprises:

generating the edge image according to the final version of the edge threshold and according to the gradient data of the predetermined region.

9. The method of claim 1, wherein the step of generating the edge image further comprises:

utilizing the selective filter to perform selective filtering upon the image data of the predetermined region to generate a selective filtering gradient image, wherein the selective filtering gradient image comprises edge components corresponding to a specific direction; and binarizing the selective filtering gradient image according to the edge threshold to generate the edge image.

10. The method of claim 9, wherein the specific direction is a vertical direction of the input image and not a horizontal direction of the input image; and an edge direction of each edge of a plurality of edges in the edge image approaches the vertical direction and not the horizontal direction.

11. The method of claim 1, wherein the edge image comprises a plurality of pixels corresponding to the predetermined region; and the step of performing the registration plate detection further comprises:

performing first sliding concentric window (SCW) calculations upon the plurality of pixels of the edge image, and performing second SCW calculations upon a portion of the predetermined region of the input image to generate an SCW image, wherein the portion of the predetermined region of the input image is selected from the predetermined region according to calculation results of the first SCW calculations, and image data of the SCW image correspond to calculation results of the second SCW calculations.

12. The method of claim 11, wherein the predetermined region of the input image represents a resized image, and the image data of the predetermined region are pixel values of the resized image; and the step of performing the first SCW calculations upon the plurality of pixels of the edge image and performing the second SCW calculations upon the portion of the predetermined region of the input image accordingly to generate the SCW image further comprises:

utilizing a plurality of sets of Edge-Based Sliding Concentric Windows (EBSCWs) to calculate edge degrees of the plurality of pixels of the edge image, respectively, wherein the edge degrees represent edge magnitudes of corresponding pixels of the resized image;

selecting a set of stronger-edge pixels from the corresponding pixels of the resized image according to the edge degrees, wherein edge magnitudes of where the set of stronger-edge pixels locate are greater than edge magnitudes of where other pixels of the corresponding pixels of the resized image locate;

utilizing a plurality of sets of Gray-level-Based Sliding Concentric Windows (GBSCWs) to calculate contrast degrees of the resized image on where the set of stronger-edge pixels locate, respectively, wherein the contrast degrees correspond to contrast magnitudes for where the set of stronger-edge pixels locate, respectively;

selecting a set of higher-contrast pixels from the set of stronger-edge pixels according to the contrast degrees, wherein contrast magnitudes for where the set of higher-contrast pixels locate are greater than contrast magnitudes for where other pixels of the set of stronger-edge pixels locate; and setting each pixel of the set of higher-contrast pixels as a predetermined pixel value to generate the SCW image, wherein a pixel value of any pixel of the SCW image, except for the set of higher-contrast pixels, is different from the predetermined pixel value.

13. The method of claim 12, wherein each set of EBSCWs of the plurality of sets of EBSCWs comprises a first inner window and a first outer window; and the step of utilizing the plurality of sets of EBSCWs to calculate the edge degrees of the plurality of pixels of the edge image respectively further comprises:

calculating a gray level average of the first inner window and a gray level average of the first outer window, respectively, and performing a first predetermined linear combination on the gray level average of the first inner window and the gray level average of the first outer window, to generate an edge degree of a first pixel of the plurality of pixels of the edge image, wherein the first pixel corresponds to the first inner window and the first outer window.

14. The method of claim 12, wherein each set of GBSCWs of the plurality of sets of GBSCWs comprises a second inner window and a second outer window; and the step of using the plurality of sets of GBSCWs to calculate the contrast degrees of the set of stronger-edge pixels respectively further comprises:

calculating a gray level average of the second inner window and a gray level average of the second outer window, respectively, and performing a second predetermined linear combination on the gray level average of the second inner window and the gray level average of the second outer window, to generate a contrast degree of a second pixel of the set of stronger-edge pixels, wherein the second pixel corresponds to the second inter window and the second outer window.

15. An apparatus for registration plate detection, comprising:

a processing circuit, arranged to control operations of the apparatus, comprising:

an image processing module, arranged to process image data of a predetermined region of an input image to generate an edge image, comprising:

a gradient image creation unit, arranged to perform a gradient calculation upon the image data of the predetermined region to generate a gradient image, wherein the gradient image comprises gradient data of the predetermined region; and an edge threshold estimation unit, arranged to perform edge threshold estimation upon the gradient data of the predetermined region to update an edge threshold via a set of iterative calculations, wherein the image processing module processes the image data of the predetermined region according to the edge threshold and according to a selective filter, to generate the edge image; and a registration plate detecting module, arranged to perform registration plate detection according to the image data of the predetermined region and according to the edge image, to determine a location of a registration plate image in the predetermined region, for performing post-processing corresponding to the registration plate image;

wherein the gradient image comprises a plurality of pixels corresponding to the predetermined region, and the gradient data of the predetermined region are utilized as gray levels of the plurality of pixels of the gradient image; a ratio of extreme pixel represents a ratio of a number of a set of extreme pixels having a common extreme gray level in a binarized version of the gradient image to a total number of pixels in the binarized version; the set of iterative calculations comprises a first iterative calculation and a second iterative calculation following the first iterative calculation; the edge threshold estimation unit performs the first iterative calculation to generate a first candidate value of the edge threshold, and uses an equation involving the ratio of extreme pixel and the first candidate value to calculate a second candidate value of the edge threshold during the second iterative calculation.

16. The apparatus of claim 15, wherein the image processing module further comprises:

a specific direction edge image creation unit, arranged to process the image data of the predetermined region according to the edge threshold and according to the selective filter to generate the edge image, wherein the specific direction edge image creation unit utilizes the selective filter to perform selective filtering upon the image data of the predetermined region, wherein the selective filtering gradient image comprises edge components corresponding to a specific direction, and the specific direction edge image creation unit binarizes the selective filtering gradient image according to the edge threshold to generate the edge image.

17. The apparatus of claim 16, wherein the specific direction is a vertical direction of the input image and not a horizontal direction of the input image; and an edge direction of each edge of a plurality of edges in the edge image approaches the vertical direction and not the horizontal direction.

18. The apparatus of claim 15, wherein the edge image comprises a plurality of pixels corresponding to the predetermined region; and the registration plate detection module comprises:

a Sliding Concentric Window (SCW) image creation unit, arranged to perform a SCW calculation, wherein the SCW image creation unit perform first SCW calculations upon the plurality of pixels of the edge image, and performs second SCW calculations upon a portion of the predetermined region of the input image to generate a SCW image, wherein the portion of the predetermined of the input image is selected from the predetermined region according to calculation results of the first SCW calculations, and image data of the SCW image correspond to calculation results of the second SCW calculations.

19. The apparatus of claim 18, wherein the predetermined region of the input image represents a resized image, and the image data of the predetermined region is pixel values of the resized image; the SCW image creation unit utilizes a plurality of sets of Edge-Based Sliding Concentric Windows (EBSCWs) to calculate edge degrees of the plurality of pixels of the edge image, respectively, wherein the edge degrees represent edge magnitudes of corresponding pixels of the resized image; the SCW image creation unit selects a set of stronger-edge pixels from the corresponding pixels of the resized image according to the edge degrees, wherein edge magnitudes of where the set of stronger-edge pixels locate are greater than edge magnitudes of where other pixels of the corresponding pixels of the resized image locate; the SCW image creation unit utilizes a plurality of sets of Gray-level-Based Sliding Concentric Windows (GB-SCWs) to calculate contrast degrees of the resized image on where the set of stronger-edge pixels locate, wherein the contrast degrees correspond to contrast magnitudes for where the set of stronger-edge pixels locate; the SCW image creation unit determines a set of higher-contrast pixels from the set of stronger-edge pixels according to the contrast degrees, wherein contrast magnitudes for where the set of higher-contrast pixels locate are greater than contrast magnitudes for where other pixels of the set of stronger-edge pixels locate; and the SCW image creation unit sets each pixel of the set of higher-contrast pixels as a predetermined pixel value to generate the SCW image, wherein a pixel value of any pixel of the SCW image except the set of higher-contrast pixels is different from the predetermined pixel value.

* * * * *